United States Patent
Wake et al.

(10) Patent No.: US 7,829,232 B2
(45) Date of Patent: Nov. 9, 2010

(54) FUEL CELL SYSTEM AND FUEL CELL CONTROL METHOD

(75) Inventors: Chihiro Wake, Wako (JP); Koichiro Miyata, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 952 days.

(21) Appl. No.: 11/700,885

(22) Filed: Feb. 1, 2007

(65) Prior Publication Data
US 2007/0184317 A1    Aug. 9, 2007

(30) Foreign Application Priority Data
Feb. 7, 2006    (JP)    ............... 2006-029492

(51) Int. Cl.
*H01M 8/04* (2006.01)
(52) U.S. Cl. .............. 429/442; 429/428; 429/450
(58) Field of Classification Search ............ 429/442, 429/400–535
See application file for complete search history.

(56) References Cited

U.S. PATENT DOCUMENTS

2006/0088754 A1* 4/2006 Hu et al. ..................... 429/38
2006/0166058 A1* 7/2006 Kudo ......................... 429/22
2007/0196707 A1* 8/2007 Komachiya et al. .......... 429/23

FOREIGN PATENT DOCUMENTS

JP    2005-183126 A    7/2005

* cited by examiner

*Primary Examiner*—Patrick Ryan
*Assistant Examiner*—Muhammad Siddiquee
(74) *Attorney, Agent, or Firm*—Westerman, Hattori, Daniels & Adrian, LLP

(57) ABSTRACT

A fuel cell system allows suppression of the deterioration of a fuel cell even if a part of a membrane configuring the fuel cell is unavailable for power production. The fuel cell is configured with a membrane, and an anode and a cathode provided so as to sandwich the membrane, and produces electric power from reaction of reactive gases via the membrane when the reactive gases are supplied to the anode and the cathode. The fuel cell system is configured with the fuel cell, an MEA power production effective area calculating means for calculating an area of the membrane surface available for power production, an upper limit power producing current calculating means for controlling the total power production of the fuel cell based on the power production effective area calculated by the MEA power production effective area calculating means, and a current controller.

5 Claims, 7 Drawing Sheets

FUEL CELL SYSTEM AND FUEL CELL CONTROL METHOD

This application is based on and claims the benefit of priority from Japanese Patent Application No. 2006-029492, filed on 7 Feb. 2006, the content of which is incorporated herein by reference.

BACKGROUND OF THE INVENTION

1. Field of the Invention

The present invention relates to a fuel cell system and a fuel cell control method. More specifically, it relates to a vehicle-installed fuel cell system and a fuel cell control method.

2. Description of Related Art

Recently, fuel cell systems have drawn attention as new sources of power that can be used to drive vehicles. For example, a fuel cell system can be configured with a fuel cell which produces electric power from chemical reactions of reactive gases, wherein a reactive gas supplying unit which supplies reactive gases to the fuel cell via a reactive gas channel, and a control unit controls the reactive gas supplying unit.

For example, the fuel cell may have a stacked structure of several tens or hundreds of stacked cells. Here, each cell is configured with a membrane electrode assembly (MEA) sandwiched between a pair of separators. The membrane electrode assembly is configured with two electrodes: an anode (positive electrode) and a cathode (negative electrode), and a solid polymer electrolyte membrane which is sandwiched between those electrodes.

The supply of hydrogen gas and oxygenated air as reactive gases to the anode and cathode of the fuel cell, respectively, causes an electrochemical reaction, from which the fuel cell produces electric power. In this case, since only basically harmless water is generated during power production, the fuel cell has attracted attention from the viewpoint of environmental impact and availability.

With the aforementioned fuel cell system, the total power production is controlled depending on the state of the fuel cell in order to reduce the load of the fuel cell. For example, a fuel cell system, which determines whether cell voltages are stable or unstable according to variations in water temperature, gas temperature, and cell voltage of the fuel cell, and controls the total power production by the fuel cell depending on the respective states using an electric current control threshold map when stable or unstable, has been proposed in the Japanese Unexamined Patent Application Publication No. 2005-183126 (hereafter, referred to as JP'126).

The fuel cell system disclosed in JP'126 controls the power producing current of the fuel cell depending on the stable or unstable states, allowing an improvement of the current characteristics in unstable conditions.

When moisture on the MEA surface turns to ice, the area where the ice is formed becomes unavailable for power production, resulting in a decrease in the areas on the MEA surface available for power production. In this case, activating the fuel cell increases the current density locally in the areas available for power production to keep the cell voltages constant.

However, the fuel cell system of the Patent disclosed in JP'126 is configured so as to control the total power production by the fuel cell depending on variations in water temperature, gas temperature, and cell voltage of the fuel cell. Accordingly, the total power production by the fuel cell is not limited as long as the cell voltages can be kept constant even if the fuel cell system is activated below freezing. As a result, the partial current density of the membrane which forms the MEA may become excessively high, possibly accelerating the deterioration of the membrane in that area.

SUMMARY OF THE INVENTION

The objective of the present invention is to provide a fuel cell system and a fuel cell control method which allows suppression of the deterioration of a fuel cell even if a part of a membrane configuring the fuel cell is unavailable for power production.

According to the present invention, a fuel cell system includes: a fuel cell, which comprises a membrane, an anode and a cathode provided so as to sandwich the membrane, and which produces electric power from a reaction of reactive gases via the membrane when the reactive gases are supplied to the anode and the cathode, a power production effective area calculating means for calculating an area of the membrane surface available for power production as a power production effective area; and a total power production controlling means for controlling the total power production of the fuel cell based on the power production effective area calculated by the power production effective area calculating means.

In this case, the membrane may be a solid polymer membrane. The reactive gas may be hydrogen gas and oxygenated air. The total power production controlling means is configured with an upper limit power producing current calculating means and a current controller.

Further, according to the first aspect of the present invention, the fuel cell system includes the power production effective area calculating means and the total power production controlling means. This allows calculation of the power production effective area of the membrane configuring the fuel cell, and control of the total power production of the fuel cell based on the calculated power production effective area. This allows prevention of an increase in the current density of the remaining parts of the membrane even if a part of the membrane configuring the fuel cell is unavailable for power production, and suppression of the deterioration of the membrane, preventing deterioration of the fuel cell.

Additionally, according to the present invention, a control method of a fuel cell includes: a membrane, and an anode and a cathode provided so as to sandwich the membrane, and produces electric power from a reaction of reactive gases via the membrane when the reactive gases are supplied to the anode and the cathode, respectively, including: calculating an area of the membrane surface available for power production as a power production effective area; and controlling the total power production of the fuel cell based on the calculated power production effective area.

According to the present invention, the same effects as described above can be provided.

Still further, according to the present invention, the power production effective area of the membrane configuring the fuel cell is calculated, and the total power production of the fuel cell is controlled based on the calculated power production effective area. This allows prevention of an increase in the current density of the residual parts of the membrane even if a part of the membrane configuring the fuel cell is unavailable for power production, and suppression of the deterioration of the membrane, preventing deterioration of the fuel cell.

DETAILED DESCRIPTION OF THE PREFERRED EMBODIMENT

Figure 1:
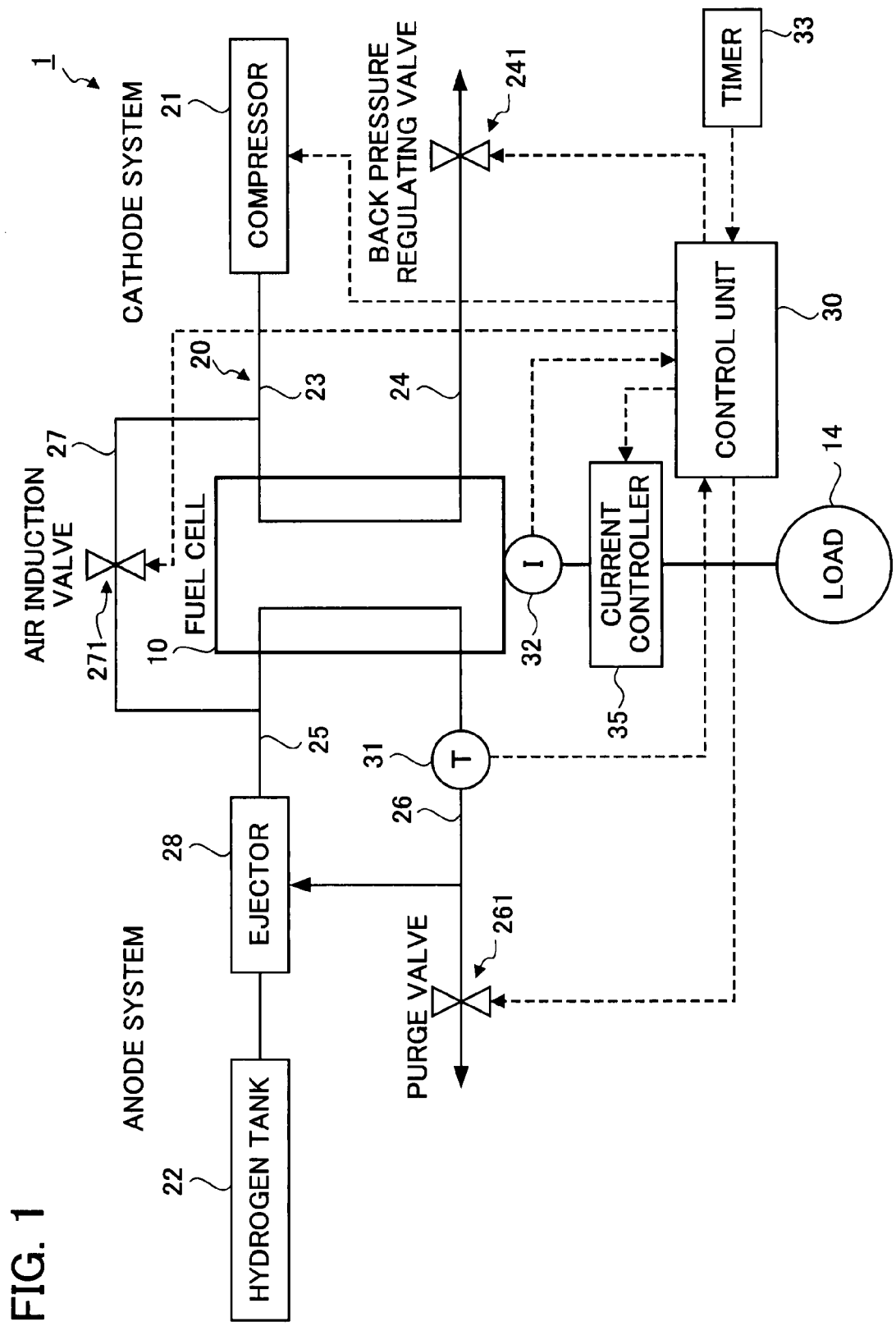
FIG. 1 is a schematic diagram of a fuel cell system according to an embodiment of the present invention.

FIG. 1 is a schematic diagram of a fuel cell system 1 according to an embodiment of the present invention.

The fuel cell system 1 is configured with a fuel cell 10, a supplying unit 20 serving as a reactive gas supplying means, which supplies hydrogen gas and air as reactive gases to the fuel cell 10, and a control unit 30 serving as a control means, which controls the supplying unit 20.

Figure 2:
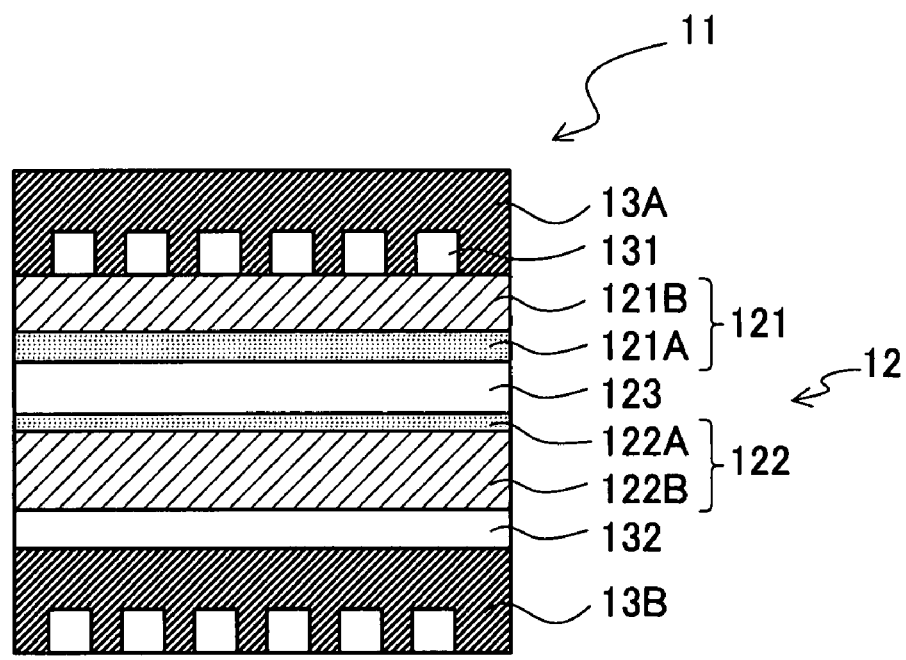
FIG. 2 is a cross-sectional view of a cell configuring a fuel cell.

FIG. 2 is a cross-sectional view of a cell 11 configuring the fuel cell 10.

In other words, the fuel cell 10 has a stacked structure of, for example, several tens or hundreds of stacked cells 11. Each cell 11 is configured with a membrane electrode assembly (MEA) 12 sandwiched between a pair of separators 13A and 13B. The MEA 12 is configured with a solid polymer membrane 123, and an anode (positive electrode) 121 and a cathode (negative electrode) 122 between which the solid polymer membrane 123 is sandwiched.

The electrodes 121 and 122 are formed of catalyst layers 121A and 122A, respectively, which make contact with the solid polymer membrane 123 and cause an oxidation reduction reaction, and gas diffused layers 121B and 122B, respectively, which make contact with the catalyst layers 121A and 122A, respectively.

A hydrogen circulating groove 131 is formed on the separator 13A which is joined to the diffused layer 121B, and an air circulating groove 132 is formed between the diffused layer 122B and the separator 13B.

Returning to FIG. 1, supply of hydrogen gas and oxygenated air as reactive gases to the anode (positive) and cathode (negative) electrodes, respectively, causes an electrochemical reaction, from which the fuel cell 10 produces electric power.

In addition, a load 14 is connected to the fuel cell 10, and a current sensor 32 and a current controller 35 are provided therebetween.

The supplying unit 20 is configured with a compressor 21, which supplies air to the cathode side of the fuel cell 10, a hydrogen tank 22, which supplies hydrogen gas to the anode side, and an ejector 28.

The compressor 21 is connected to the cathode side of the fuel cell 10 via an air supply channel 23.

In addition, an air discharge channel 24 is connected to the cathode side of the fuel cell 10, and a back pressure regulating valve 241 is provided at the end of the air discharge channel 24.

The hydrogen tank 22 is connected to the anode side of the fuel cell 10 via a hydrogen supply channel 25. The aforementioned ejector 28 is provided along the hydrogen supply channel 25.

In addition, a hydrogen discharge channel 26 is connected to the anode side of the fuel cell 10, and a purge valve 261 is provided at the end of the hydrogen discharge channel 26. A temperature sensor 31 is provided along the hydrogen discharge channel 26 near the fuel cell 10. In addition, the hydrogen discharge channel 26, which is closer to the anode side than the purge valve 261, is branched and connected to the ejector 28.

The ejector 28 collects hydrogen gas which flows through the hydrogen discharge channel 26 via the branch channel thereof, and makes it flow back to the hydrogen supply channel 25.

The air supply channel 23 and the hydrogen supply channel 25 are connected via a bypass 27 along which an air induction valve 271 is provided.

In addition, the aforementioned compressor 21, the back pressure regulating valve 241, the purge valve 261, the air induction valve 271, and the current controller 35 are controlled by a control unit 30, which will be described later. Furthermore, the aforementioned temperature sensor 31, the current sensor 32, and a timer 33 are connected to the control unit 30.

The procedure to produce electric power by the fuel cell 10 is described below.

Hydrogen gas is supplied to the anode side of the fuel cell 10 via the hydrogen supply channel 25 from the hydrogen tank 22 while the purge valve 261 is closed. In addition, air is supplied to the cathode side of the fuel cell 10 via the air supply channel 23 by driving the compressor 21.

The hydrogen gas and air supplied to the fuel cell 10 are used for power production and then flow into the hydrogen discharge channel 26 and air discharge channel 24 from the fuel cell 10 along with residual water such as generated water on the anode side. At this time, since the purge valve 261 is closed, hydrogen gas flowing into the hydrogen discharge channel 26 flows back to the ejector 28 and is reused.

Afterwards, hydrogen gas, air, and residual water are discharged from the hydrogen discharge channel 26 and the air discharge channel 24 by opening the purge valve 261 and the back pressure regulating valve 241 to an appropriate degree of opening.

Figure 3:
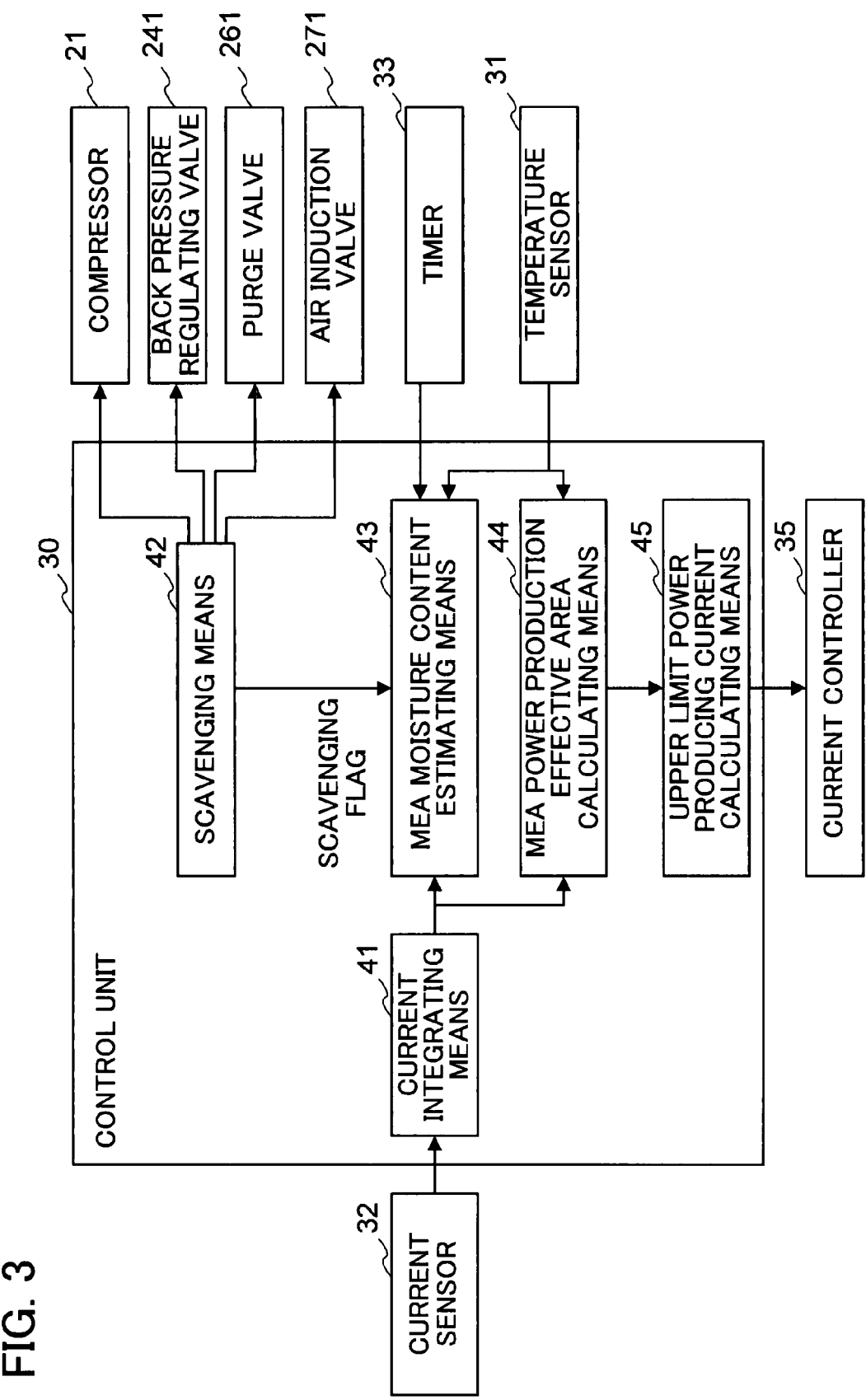
FIG. 3 is a block diagram of a control unit used by the fuel cell system.

FIG. 3 is a block diagram of the control unit 30.

The control unit 30 is configured with a current integrating means 41, a scavenging means 42, an MEA moisture content estimating means 43, an MEA power production effective area calculating means 44, and an upper limit power producing current calculating means 45.

The temperature sensor 31 measures the temperature of the hydrogen gas which flows through the hydrogen discharge channel 26, and transmits the result to the control unit 30 as the temperature within the fuel cell 10.

The current sensor 32 measures the power producing currents generated by the fuel cell 10, and transmits the results to the control unit 30.

The timer 33 is used to measure the elapsed time from a time specified by the control unit 30. More specifically, the timer 33 is set by the control unit 30 when driving of the fuel cell 10 is stopped, and transmits the elapsed time from the set time to the control unit 30. That elapsed time is the time at which the fuel cell 10 is stopped (hereafter, referred to as soak), and is called soaking time.

The current controller 35 controls the power producing current generated by the fuel cell 10 according to the upper limit power producing current output from the upper limit power producing current calculating means 45.

In addition, an ignition switch not shown in the drawing is connected to the control unit 30. The ignition switch is provided on the driver's seat of a fuel-cell vehicle, and transmits on/off signals to the control unit 30 based on manipulation by a driver. The control unit 30 produces electric power of the fuel cell 10 based on whether the ignition switch is turned on or off.

The current integrating means 41 calculates current integrated values by integrating the current values measured by the current sensor 32, and outputs the current integrated values.

The scavenging means 42 performs scavenging processing for the fuel cell 10. In other words, it scavenges by controlling the purge valve 261, the back pressure regulating valve 241, and the air induction valve 271, and sets a scavenging flag from "0" to "1" upon completion of the scavenging processing.

More specifically, the scavenging means opens the air induction valve 271, the purge valve 261, and the back pressure regulating valve 241 to drive the compressor 21. Air supplied from the compressor 21 is then discharged to the outside via the air supply channel 23, the cathode side of the fuel cell 10, and the air discharge channel 24. In addition, air supplied from the compressor 21 is also discharged to the outside via the air supply channel 23, the bypass 27, the hydrogen supply channel 25, the anode side of the fuel cell 10, and the hydrogen discharge channel 26. This scavenges the aforementioned air supply channel 23, the air discharge channel 24, the hydrogen supply channel 25, and the hydrogen discharge channel 26.

The MEA moisture content estimating means 43 estimates variations in the MEA moisture content during soaking and during power production.

More specifically, variations in the MEA moisture content when soaking are estimated based on logs of the scavenging flag output by the scavenging means 42, soaking times transmitted from the timer 33, and temperatures within the fuel cell 10 transmitted from the temperature sensor 31.

In addition, variations in the MEA moisture content during power production are estimated based on the current integrated values output from the current integrating means 41.

Figure 4:
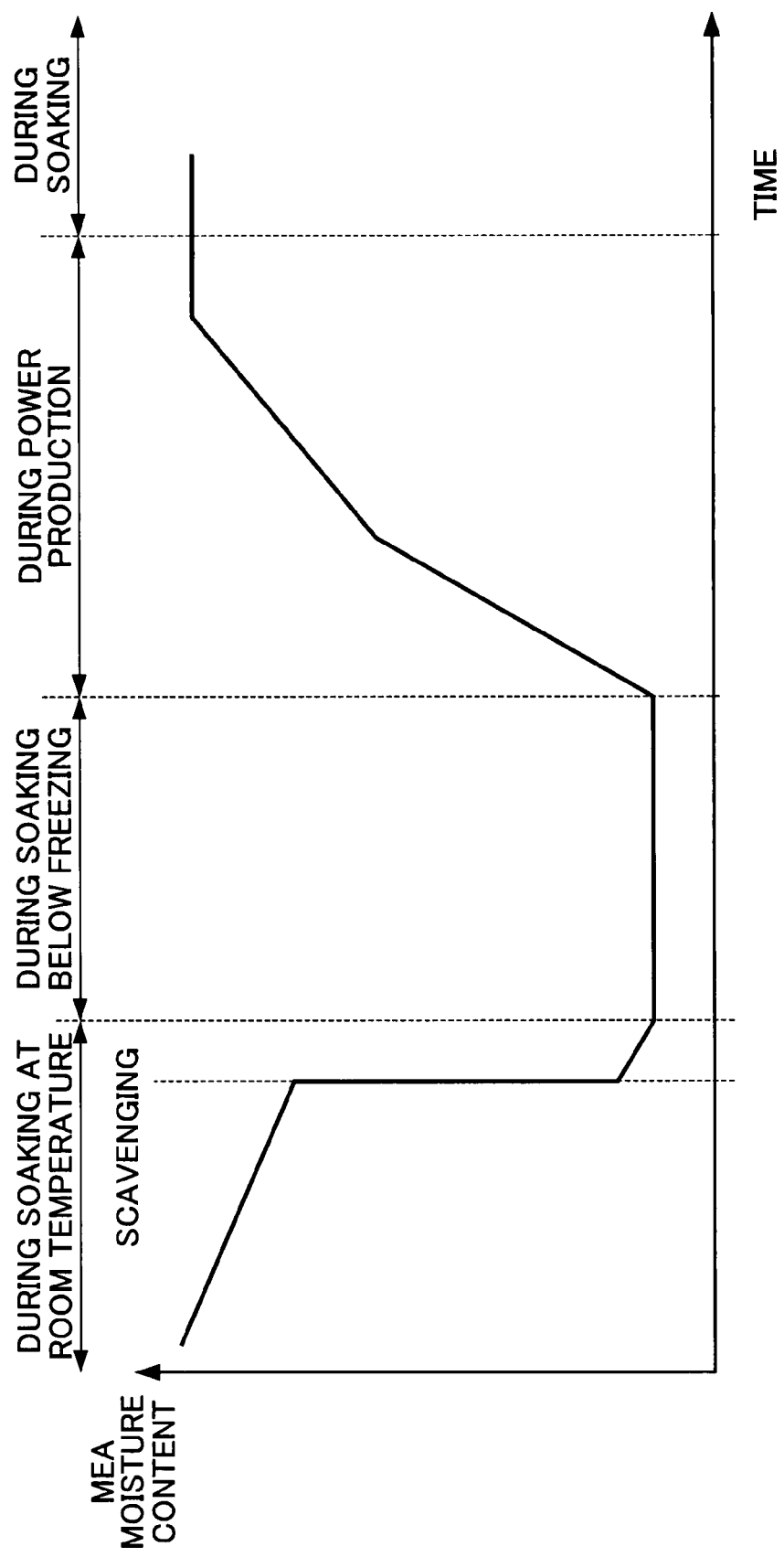
FIG. 4 is a graph illustrating a relationship between variations in the moisture content of a membrane which configures the fuel cell and states of the fuel cell system.

FIG. 4 is a graph illustrating a relationship between the fuel cell system state and variations in the MEA moisture content.

While soaking at room temperature, the cathode system is opened to the atmosphere, and the moisture contained in the cathode system is then emitted. Accordingly, the MEA moisture content decreases gradually. In this case, activation of the scavenging means 42 dries the MEA at once through the scavenging processing, and causes a drastic decrease in the MEA moisture content.

Afterwards, while soaking below freezing, since the moisture adhered to the MEA surface is frozen, it does not readily evaporate, and thus the MEA moisture content barely changes.

When power production is then started by activating the fuel cell 10, reactive gas reacts and the MEA moisture content gradually increases.

As described above, the MEA moisture content does not increase much when the driving time of the fuel cell 10 is short (so-called short activation), and decreases when the soaking time is long.

The MEA power production effective area calculating means 44 calculates the power production effective areas of the MEA surface when the fuel cell 10 is activated and during power production thereafter.

More specifically, when the fuel cell 10 is activated below freezing, the power production effective area is calculated as the default MEA power production effective area based on the MEA moisture content estimated by the MEA moisture content estimating means 43. This is because the moisture on the MEA surface freezes below the freezing point, and thus the power production effective area decreases significantly. Therefore, the default MEA power production effective area is mostly determined based on the MEA moisture content.

Figure 5:
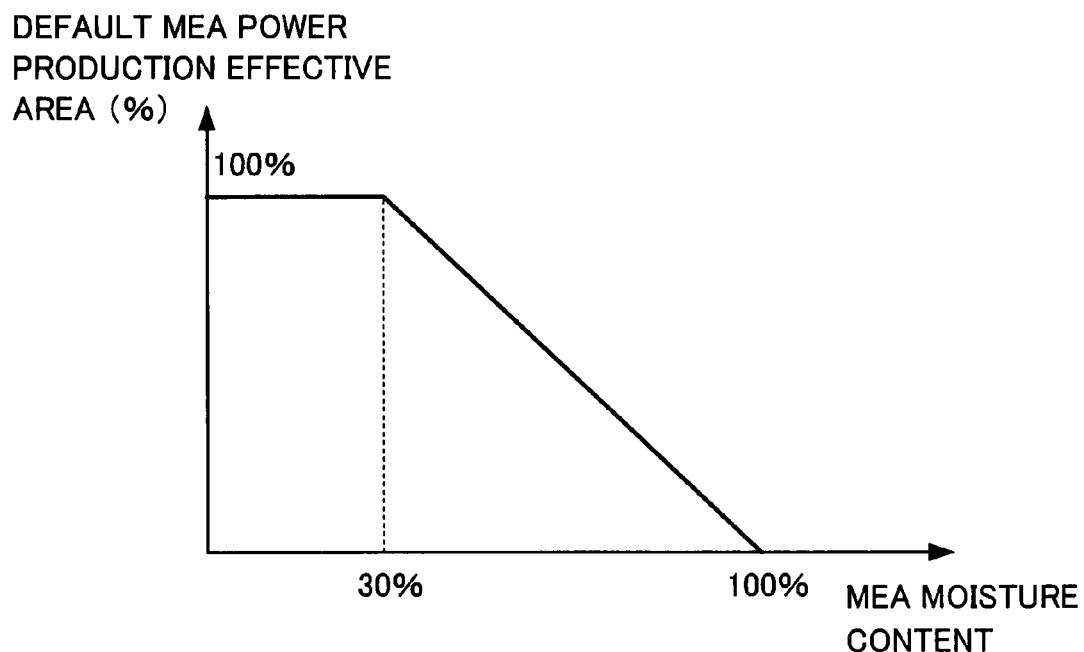
FIG. 5 is a graph illustrating a relationship between the default power production effective area and the moisture contents in the membrane.

FIG. 5 is a graph illustrating a relationship between the MEA moisture content and the default power production effective area.

If the MEA moisture content is less than approximately 30%, moisture is contained only within the MEA. Thus, the default MEA power production effective area is approximately 100%.

On the other hand, if the MEA moisture content exceeds approximately 30%, the moisture on the MEA surface freezes, and the default MEA power production effective area gradually decreases from approximately 100%. If the MEA moisture content is approximately 100%, the default MEA power production effective area is approximately 0%.

In addition, during power production, the MEA power production effective area is calculated based on the temperatures within the fuel cell 10 transmitted from the temperature sensor 31 or the current integrated values calculated by the current integrating means 41.

Figure 6:
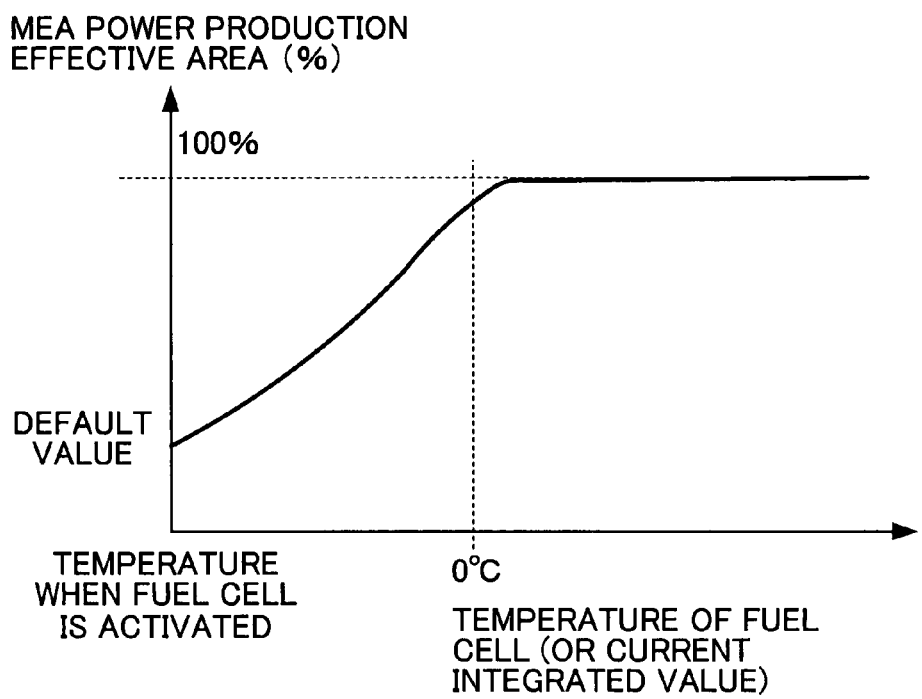
FIG. 6 is a graph illustrating a relationship between power production effective area of the membrane and temperature of the fuel cell.

FIG. 6 is a graph illustrating a relationship between the temperatures in the fuel cell 10 and the MEA power production effective area.

It should be noted that the temperatures in the fuel cell 10 of FIG. 6 can be considered as the current integrated values.

The MEA power production effective area gradually increases from the default value as the temperature changes from that at activation of the fuel cell 10 to 0° C., and becomes approximately 100% when the temperature is approximately 0° C.

The upper limit power producing current calculating means 45 calculates the upper limit power producing current based on the MEA power production effective area, and then outputs the upper limit power producing current to the current controller 35.

Figure 7:
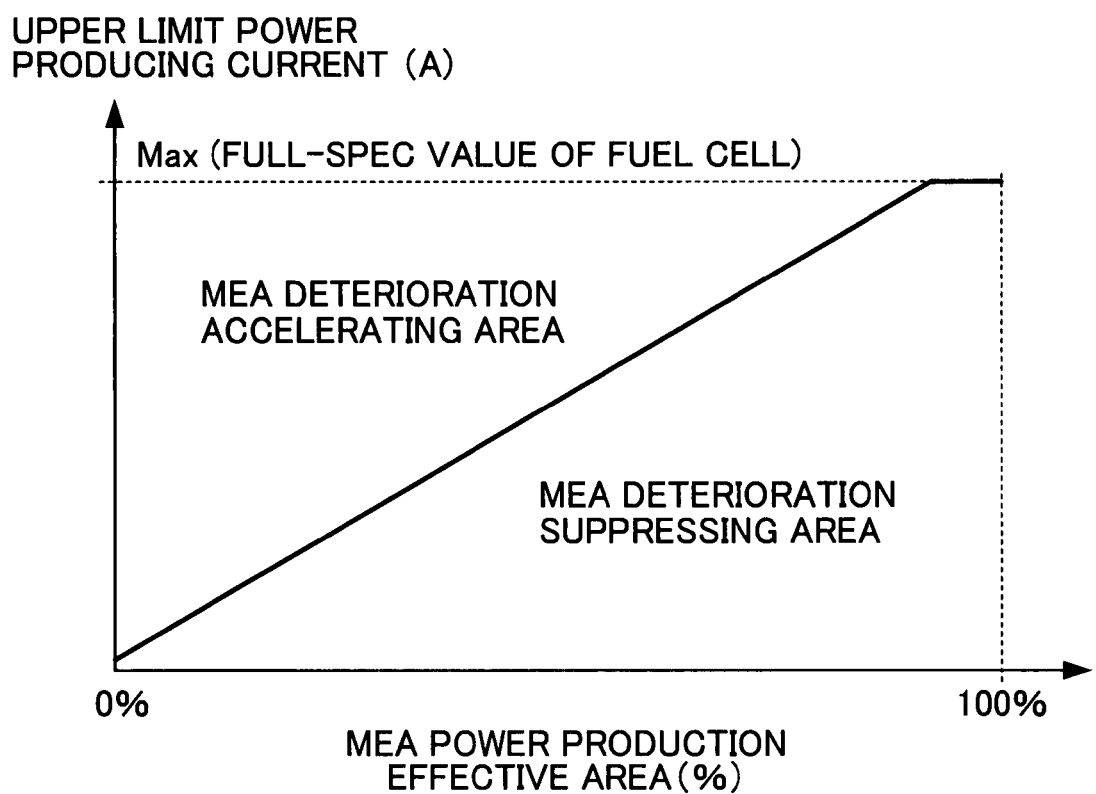
FIG. 7 is a graph illustrating a relationship between the upper limit power producing current and the power production effective area of the membrane.

FIG. 7 is a graph illustrating a relationship between the MEA power production effective area and the upper limit power producing current.

If the MEA power production effective area is 0%, the upper limit power producing current should be set to approximately zero, and should be increased as the MEA power production effective area increases. If the MEA power production effective area is approximately 100%, the upper limit power producing current is maximum (full-spec value of the fuel cell 10).

In this case, the area on the upper left side in FIG. 7 is an MEA deterioration accelerating area where the MEA current density becomes excessively high locally, accelerating the deterioration of the MEA. On the other hand, the area on the lower right side in FIG. 7 is an MEA deterioration suppressing area where the MEA current density does not become excessively high locally, suppressing the deterioration of the MEA.

Figure 8:
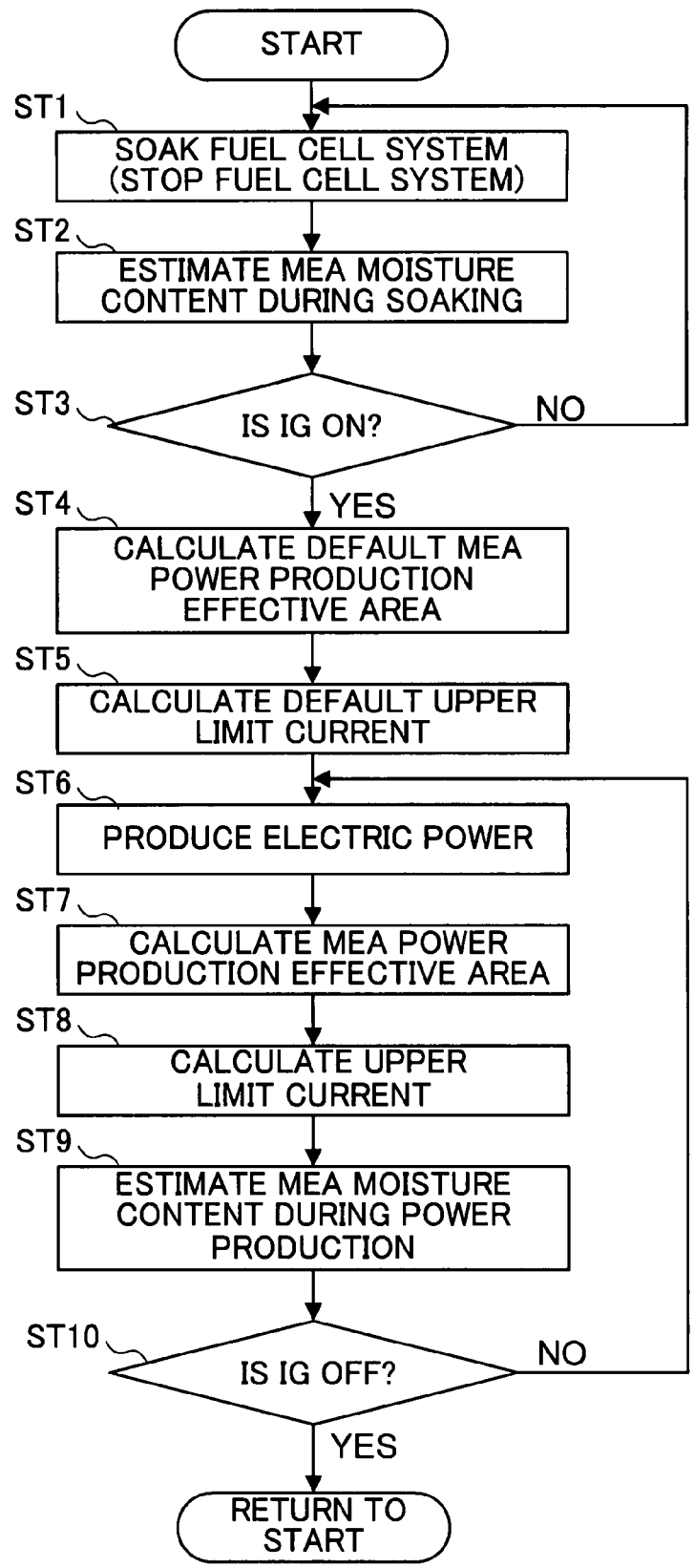
FIG. 8 is a flowchart of the fuel cell system.

The operation of the aforementioned fuel cell system 1 is now described while referencing the flowchart of FIG. 8.

To begin with, the fuel cell system 1 is soaked (stopped) (ST1). In this soaked state, the MEA moisture content estimating means 43 estimates the variations in the MEA moisture content during soaking (ST2). Afterwards, the control unit 30 determines whether or not the ignition switch (IG) is turned on (ST3). If this determination is "NO", processing returns to ST1. If "YES", processing proceeds to ST4.

In ST4, the MEA power production effective area calculating means 44 calculates the default MEA power production effective area (ST4), and the upper limit power producing current calculating means 45 calculates the upper limit power producing current based on the default MEA power production effective area (ST5). The fuel cell 10 is then activated to produce electric power while controlling the power producing current using the current controller 35 (ST6).

During power production, the MEA power production effective area calculating means 44 calculates the MEA power production effective area (ST7), the upper limit power producing current calculating means 45 calculates the upper limit power producing current based on the MEA power production effective area (ST8), and the MEA moisture content estimating means 43 estimates variation in MEA moisture content during power production (ST9). Afterwards, the control unit 30 determines whether or not the ignition switch (IG) is turned off (ST10). If this determination is "NO", processing returns to ST6 to continue power production. If "YES", processing returns to ST1.

The above described embodiment of the present invention has several advantages.

For example, the fuel cell system 1 includes the MEA power production effective area calculating means 44, the upper limit power producing current calculating means 45, and the current controller 35. This allows the calculation of the power production effective area of the MEA 12 containing the solid polymer membrane 123 configuring the fuel cell 10, and control of the total power production of the fuel cell 10 based on the calculated power production effective area. This allows prevention of an increase in the current density of residual parts of the solid polymer membrane 123 even if a part of the solid polymer membrane 123 is unavailable for power production, and suppression of the deterioration of the solid polymer membrane 123, preventing deterioration of the fuel cell 10.

Also, the fuel cell system 1 further includes the temperature sensor 31. The MEA power production effective area calculating means 44 calculates the power production effective area of the MEA 12 containing the solid polymer membrane 123 when the temperature detected by the temperature sensor 31 is below freezing. This allows control of the total power production even if the fuel cell 10 is activated below freezing, preventing an increase in the current density of the residual parts of the solid polymer membrane 123, and further increasing the durability of the solid polymer membrane 123.

The fuel cell system 1 further includes the MEA moisture content estimating means 43. The MEA power production effective area calculating means 44 calculates the power production effective area of the MEA 12 containing the solid polymer membrane 123 based on the temperature detected by the temperature sensor 31 and the moisture content estimated by the MEA moisture content estimating means 43. This allows more accurate calculation of the power production effective area of the solid polymer membrane 123 based on the temperature and the moisture content.

Although, the temperature within the fuel cell 10 is measured by the temperature sensor 31, the temperature within the fuel cell 10 may also be directly measured by a sensor in or near the fuel cell 10, itself.

While the preferred embodiments of the present invention have been described and illustrated above, it is to be understood that they are exemplary of the invention and are not to be considered to be limiting. Additions, omissions, substitutions, and other modifications can be made thereto without departing from the spirit or scope of the present invention. Accordingly, the invention is not to be considered to be limited by the foregoing description and is only limited by the scope of the appended claims.

What is claimed is:

1. A control method for a fuel cell, which includes an anode, a cathode and a membrane sandwiched therebetween, and which produces electric power when reactive gases are supplied to the anode and the cathode, comprising the steps of:
   calculating an area of the membrane surface available for power production as a power production effective area; and
   controlling the total power production of the fuel cell based on the calculated power production effective area.

2. The control method for a fuel cell of claim 1, further comprising the steps of:
   detecting a temperature within the fuel cell and further, during when the temperature is below freezing, calculating the power production effective area based upon the detected temperature.

3. The control method for a fuel cell of claim 2, further comprising the steps of:
   estimating a moisture content of the membrane, and then calculating the power production effective area based on the detected temperature and the moisture content of the membrane.

4. The control method for a fuel cell of claim 3, further comprising the steps of:
   measuring a elapsed stopping time of the fuel cell, and then estimating the moisture content of the membrane based on at least the measured elapsed stopping time when the fuel cell is stopped.

5. The control method for a fuel cell of claim 3, further comprising the steps of:
   calculating a current integrated value when the fuel cell is producing electric power, and then estimating the moisture content of the membrane based on at least the current integrated value when the fuel cell is producing electric power.

* * * * *